Oct. 5, 1965   M. G. GABRIEL   3,209,540
COMPOUND HYDROKINETIC TORQUE CONVERTER
Filed Dec. 23, 1964   5 Sheets-Sheet 5
Fig. 5
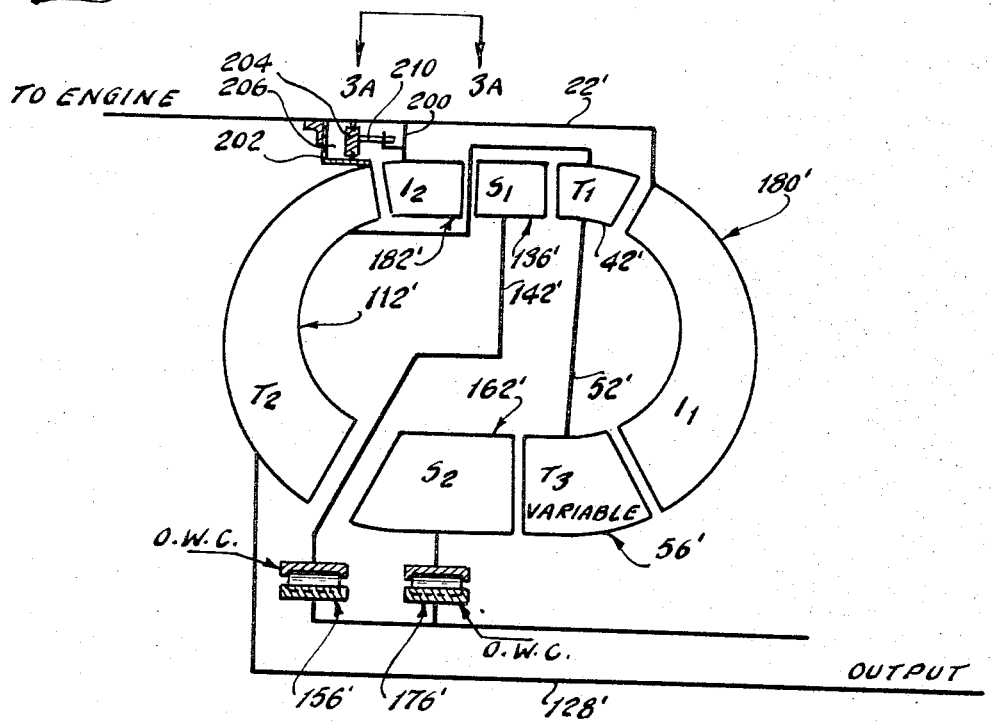
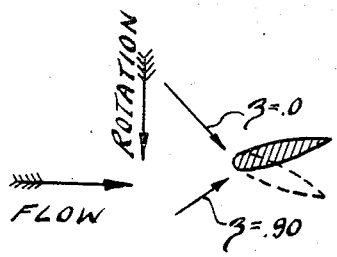
Fig. 5A
INVENTOR:
MARTIN G. GABRIEL
BY John A. Faulkner
& Donald J. Harrington
ATTORNEYS.

United States Patent Office 3,209,540
Patented Oct. 5, 1965

3,209,540
COMPOUND HYDROKINETIC TORQUE
CONVERTER
Martin G. Gabriel, Dearborn, Mich., assignor to Ford
Motor Company, Dearborn, Mich., a corporation of
Delaware
Filed Dec. 23, 1964, Ser. No. 423,894
8 Claims. (Cl. 60—54)

This is a continuation-in-part of application Serial No. 283,228, filed May 27, 1963, now abandoned.

My invention relates generally to multiple element hydrokinetic torque converter mechanisms, and more particularly to a hydrokinetic torque converter mechanism having a compound impeller that is situated within a torus circuit with compound turbine and stator members. It is capable of establishing a relatively high degree of torque ratio carry-out throughout an increased speed ratio range and is adapted especially for drivelines for engine powered automotive vehicles.

In a preferred embodiment of invention, I have provided a main impeller and a first turbine section situated at the impeller blade flow exit region. A stator section is situated at the flow exit region of the first turbine and this in turn is followed by an auxiliary impeller section mounted for rotation in unison with the main impeller section. The auxiliary impeller section then is followed by a second turbine section that in turn is followed by a second stator section. A third turbine section also is provided within the circuit adjacent the flow entrance section of the main impeller. I thus have provided two hydrokinetic torque converter mechanisms situated in series relationship within a common torus circuit, each mechanism comprising an impeller, a stator and at least one turbine.

In a hydrokinetic unit of this type, each impeller member functions to increase the moment of momentum of the fluid that traverses the torus circuit. As the fluid passes through a turbine section of the mechanism, the moment of momentum is decreased, and this causes a turbine torque to be developed. For this reason, the flow that passes from the exit section of the turbine is passed through a stator section situated at the flow exit region to redirect the fluid flow and increase the tangential component of the absolute fluid flow velocity vector. The entrance angle of the fluid flow that enters the impeller entrance section thus is in a direction which would make an augmentation of the moment of momentum possible as the fluid is traversed through the bladed sections of the impeller.

In my improved mechanism I have provided a second impeller stage situated between the flow exit section of the first stator stage and the entrance section of the second turbine stage. This results in an increase in the moment of momentum of the fluid before it enters the second turbine stage. This in turn results in increased operating efficiency and torque ratio and a more satisfactory converter size factor characteristic, the size factor being defined as the impeller speed divided by the square root of the impeller torque. I contemplate that this will result in a relatively rapidly raising engine speed during the acceleration period.

The provision of an improved hydrokinetic torque converter mechanism of the type above set forth being a principal object of my invention, it is a further object of my invention to provide a compound torque converter mechanism having two converter systems situated in series within a common circuit so that the most desirable features of each can be utilized to advantage.

A first embodiment of my invention includes a pair of series-related hydrokinetic torque converter assemblies wherein the impeller section for the second converter assembly can be connected to and disconnected from the impeller for the first assembly by means of a selectively engageable friction clutch. Thus the second impeller can be caused to float freely within the torus circuit when the entrance angles for the relative fluid flow velocity vectors are not favorable. The provision of a hydrokinetic torque convertor mechanism of this type is an object of my invention.

Another disclosed embodiment of my invention includes a pair of series-related torque converter assemblies in which the bladed impellers rotate together in unison throughout the entire speed ratio range. This embodiment includes, however, a final stator having a stator blade angle adjusting mechanism for providing a favorable entrance angle for the toroidal fluid flow vectors at the entrance region of the impeller for the first converter assembly. The provision of a mechanism of this type is another object of my invention.

Another disclosed embodiment of my invention includes a third turbine section situated at the flow entrance region of the main impeller. The angularity of the blades of this third turbine section can be adjusted so that an optimum blade angle will be provided to satisfy the varying angularity of the absolute fluid flow velocity vector at this point in the torus circuit. The provision of a mechanism of this type is another object of my invention.

It is a further object of my invention to provide a hydrokinetic torque converter mechanism having a compound impeller with a first radial outflow section and a second axial flow section, the latter being located at a radially outward region of the torus flow circuit adjacent the entrance section of the second section of the compound turbine.

In another embodiment of my invention, I have made provision for adjustably positioning the angularity of the second impeller section so that its blade angles will be matched more favorably with the absolute fluid flow velocity vector angles at various speed ratios. The provision of such an adjustable auxiliary impeller blade exit feature is another object of my invention.

For the purpose of describing my invention more particularly, reference will be made to the accompanying drawings, wherein:

FIGURES 5 and 5A show in schematic form a multiple element torque converter embodying the features of my invention and wherein provision is made for adjustably positioning the angularity of the second impeller section.

Figure 3:
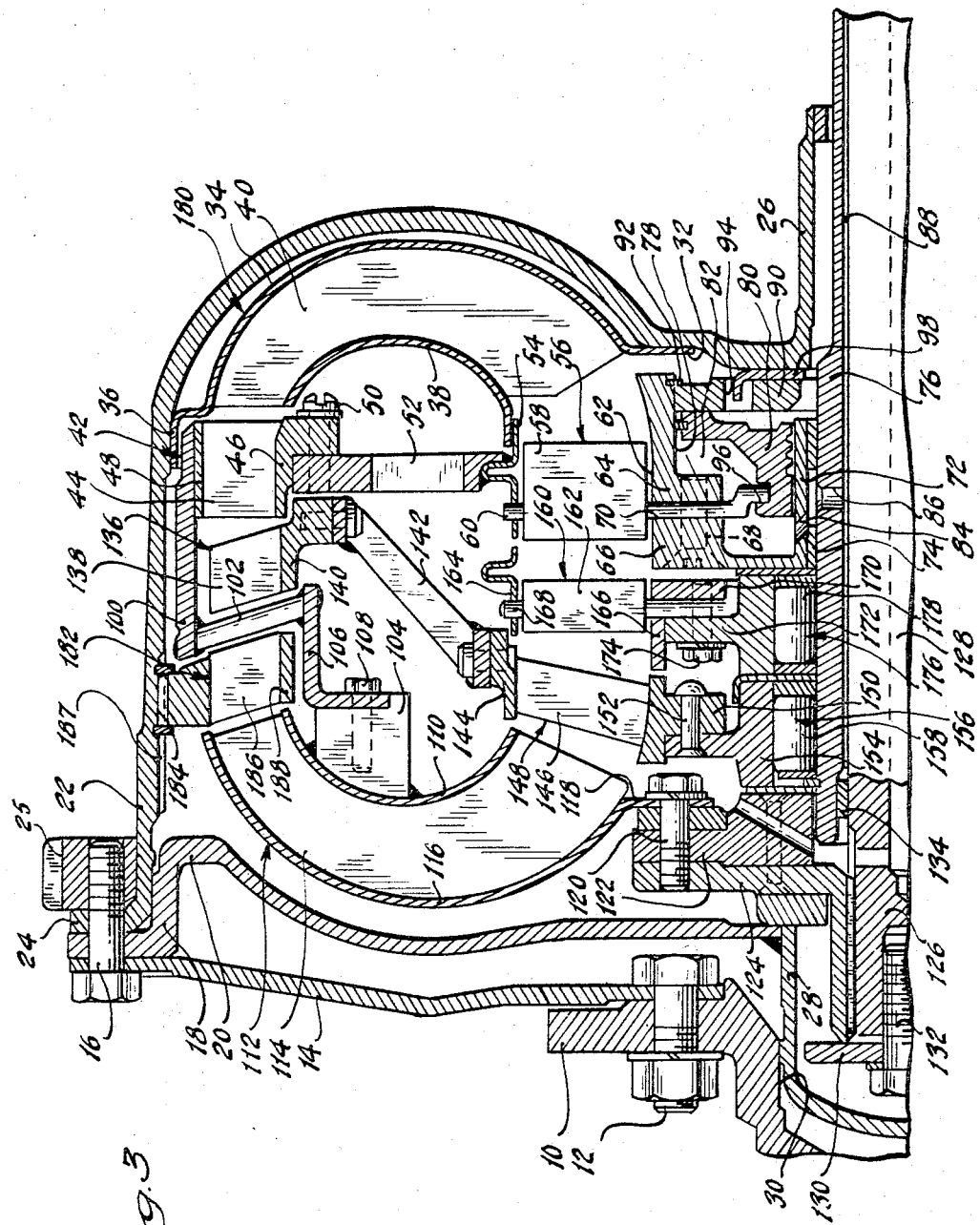
FIGURE 3 shows in cross-sectional form another embodiment of my invention. This embodiment includes an adjustable third turbine stage.

Referring first to FIGURE 3, numeral 10 designates a flange carried by the crankshaft of an internal combustion vehicle engine. It is bolted by means of bolts 12 to the hub of a drive plate 14. This drive plate in turn is bolted by bolts 16 to the outer periphery 18 of an impeller shell part 20. A second impeller shell part 22 is secured at its periphery 24 to the periphery 18 and to the periphery of the drive plate 14. A starter ring gear 25 can be carried by the shell part 22 as indicated.

Shell part 22 is in the form of a torus and is provided with a hub 26 that may be journaled in a conventional fashion within an opening formed in the transmission housing as shown.

The hub of shell part 20 is welded to a pilot member 28. This member 28 in turn is received within an opening 30 situated within the crankshaft flange 10.

The radially inward portion of the shell part 22 has secured thereto the inner margin 32 of an inner impeller shell 34. The outer margin of the shell 34 is secured by spot welding to a radially outward portion of the inner surface of shell part 22 as indicated at 36.

An inner impeller shroud 38 is secured to the inner margins of impeller blades 40. These blades define radial outflow passages. A first turbine element is identified by reference character 42. It includes blade elements 44 that are situated at the flow exit section of the blades 40. Blades 44 are situated between a first shroud 46 and a second shroud 48, the former being secured by screws 50 to a torque transfer member 52. This member 52 in turn is secured to a first shroud 54 for a third turbine section identified by reference character 56. This turbine section comprises blades 58 situated at angularly spaced locations within the torus circuit. Blades 58 are mounted upon adjustable blade supporting shafts 60 which are received through openings formed in the shroud 54.

A second shroud for the third turbine section is shown at 62. It comprises a first part 64 in the form of an annular cylinder and a second part 66. The two parts 64 and 66 are joined together by screws 68. Openings 70 defined by the mating surfaces of the parts 64 and 66 receive shafts 60.

Part 66 includes an extension 72 which is journaled by means of bushing 74 upon a relatively stationary stator shaft 76. This shaft in turn can be connected in a conventional fashion to the transmission housing, not shown.

Parts 64 and 66 cooperate to define an annular cylinder 78 within which is received slidably an annular piston 80. This piston 80 and the cylinder 78 cooperate to define a pressure chamber 82. Chamber 82 is in fluid communication with a pressure port 84 which in turn communicates with a radial passage 86 formed in stator sleeve shaft 76. This passage 86 in turn communicates with an annular passage 88 that is formed within the interior of shaft 76. Fluid pressure from a suitable control valve system, not shown, can be supplied to passage 88, and this in turn controls the pressure in passage 82.

A closure member 90 is secured by means of a snap ring 92 to the open end of the cylinder 78. It is apertured, as shown at 94, so that the pressure that exists within the torus circuit will be made available to urge the piston 80 in a left-hand direction as viewed in FIGURE 1. Thus by controlling the pressure balance across the piston 80, the position of the piston 80 can be controlled as desired.

The radially inward extremities of the shafts 60 are offset and are received within an annular groove 96 formed in piston 80. As the piston 80 is shifted axially, the shafts 60 then will oscillate about their respective radial axes and cause a corresponding adjustment of the angularity of the blades 58.

A thrust washer 98 is situated between closure member 90 and the hub portion of the impeller shell parts 22.

The shroud 48 of the first turbine section 44 is connected to a torque transfer member 100 which extends generally in an axial direction. This member in turn is connected to web elements 102 which extend through the torus circuit. The radially inward ends of the elements 102 are connected to a boss 104 by means of a bracket 106. This bracket can be secured to the boss 104 by bolts 108.

The web elements 102 may be designed with an aerodynamic cross section to reduce to a minimum the degree of resistance to the toroidal fluid flow.

Boss 104 is carried by an inner shroud 110 of a second turbine section 112. This turbine section includes blades 114 which are secured at their inner margins to the shroud 110. An outer shroud 116 is secured to the outer margins of the blades 114. The shrouds 110 and 116 cooperate with the blades 114 to define radial inflow passages.

The inner margin 118 of the shroud 116 is secured by bolts 120 to a hub member 122 and to a second hub member 124. Member 124 in turn is internally splined to an externally splined portion 126 of a turbine shaft 128. A reaction disc 130 can be bolted by a bolt 132 to the end of the shaft 128 as indicated, thereby holding the shaft 128 axially fast with respect to the turbine hub member 124. Shaft 128 can be journaled within the stationary sleeve shaft 76 by bushings, one of which is shown at 134.

A first stator section 136 is situated at the flow exit section of the first turbine section 44. It includes blades 138 that are situated within the torque transfer member 100. These blades 138 are connected to an inner shroud 140 in the form of an annular ring. This ring 140 is connected to a web 142 which is secured at its inner margin to an annular ring 144. This ring 144 in turn is secured to the outer ends of the webs 146.

Webs 146 include a shroud in the form of an annular ring 150 which is secured by rivets 152 to the outer race 154 of an overrunning coupling 156. An inner race for the coupling 156 is defined by the outer surface of the stator shaft 76. It includes rollers or sprags 158 that are situated between the two races, the outer one of which may be cammed if the elements 158 are in the form of rollers.

Located at the flow exit region of the secondary turbine section 112 is a second stator section 160 which includes stator blades 162 located between a first shroud 164 and a second shroud 166. These blades 162 are mounted upon blade supporting shafts 168 which are received through cooperating openings formed in the shroud 164 and shroud 166. Shroud 166 in turn is defined by a first part in the form of an annular ring 170, and a second part 172. These parts are held together by bolts 174, and shafts 168 are situated within cooperating openings defined by the mating surfaces of parts 172 and 170.

Part 172 defines an outer race for a second overrunning brake identified by reference character 176. This brake 176 may include sprags or rollers 178 which are situated between the outer surface of sleeve shaft 76 and the inner surface of the outer race. If elements 176 are in the form of rollers, the outer race can be cammed in a conventional fashion.

Brakes 156 and 176 inhibit rotary motion of the stator sections in one direction, but they will permit free-wheeling motion of the stator sections in the opposite direction, which corresponds to the direction of rotation of the impeller.

The impeller is formed in two sections that are generally identified by reference characters 180 and 182. Section 182 includes a race 184 which is splined or otherwise secured to the inner periphery of shell part 22. Suitable splines 187 can be provided for this purpose.

Impeller blades 186 are carried by the shroud 184. These blades carry an inner shroud 188. Blades 186 are situated directly adjacent the flow entrance section of the turbine section 112 and they rotate in unison with the blades 40.

Figure 4:
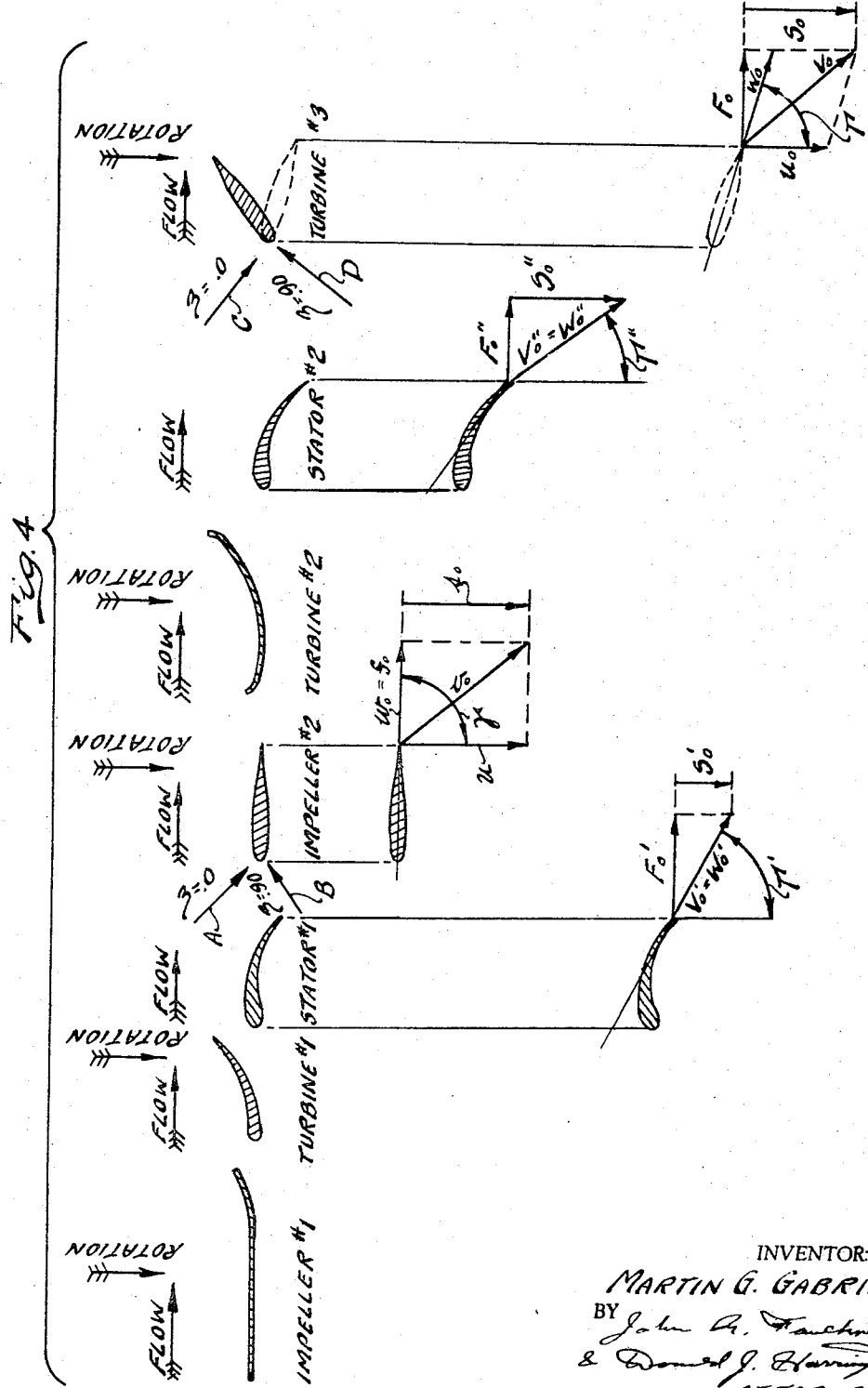
FIGURE 4 is a schematic blade diagram and vector representation of the fluid flow vectors within the torus circuit.

In FIGURE 4, I have illustrated in schematic form the blades of the converter mechanism of FIGURE 3. They are illustrated in the form of a cascade by unwrapping the torus circuit. The fluid flow then may be represented by vectors that extend in a right-hand direction as viewed in FIGURE 4 while the direction of rotation of the impellers and the turbines can be represented by vectors that extend downwardly as viewed in FIGURE 4.

The direction of the absolute fluid flow velocity vector at the entrance section of the second impeller section will vary depending upon the relative speed ratio that exists. At stall or zero speed ratio, this vector is represented by the symbol A as viewed in FIGURE 4. At a relatively high speed ratio, however, the vector will change direction as indicated by the symbol B in FIGURE 4. It is apparent, therefore, that the most desirable blade angle for a minimum shock loss condition will be some compromise value between the angle of the vectors at stall and the angle of the vectors under cruising conditions. In the particular embodiment shown, the blade angle may be approximately 90°.

The moment of momentum of the fluid changes as it passes through the second impeller section. This in turn is a function of the torque acting upon the secondary impeller section. The change in the moment of momentum, however, is equal to the moment of momentum of the fluid that leaves the secondary impeller section less the moment of momentum that leaves the exit section of the preceding first stator section. This is true since the moment of momentum at the entrance of the second impeller section is equal to the moment of momentum of the fluid at the exit of the first stator section.

Shown also in FIGURE 4 is a vector diagram showing the characteristics of a particle of fluid at the exit of the first stator section and at the exit of the second impeller section. The symbol F' represents the toroidal fluid flow vector at the secondary stator exit. The fluid velocity vector measured along the stator blade itself is indicated by the vector W'. This also equals the absolute fluid flow velocity vector V' since the stator is stationary during operation in the torque conversion range at low speed ratios. The vertical component of the vector sum is equal to the vector shown at S'. This vector is the tangential fluid flow velocity vector at the secondary stator exit.

The corresponding vectors for the exit of the secondary impeller section also are shown in FIGURE 4. The toroidal flow vector is shown at $f_o$. Since the blade angle itself is approximately 90°, this vector also represents the vector for the fluid flow $w$ along the blade itself.

The rotational vector due to the driving motion of the impellers is shown by the symbol $u$. The vector sum is shown at $V_o$. The exit blade angle itself is represented by the symbol $\gamma$.

The tangential component of the absolute fluid flow velocity vector is shown at $S_o$. It will be apparent from a comparison of the two vector diagrams thus described that the tangential component of the absolute fluid flow velocity vector is increased, which means that the secondary impeller section provides a definite torque contribution. It follows from this, therefore, that the moment of momentum of the fluid that enters the second turbine section will be greater than it would be if the secondary impeller section were not located strategically within the circuit in this fashion. The turbine torque, therefore, will be increased since the total effective change in the moment of momentum of the fluid as it passes through the second turbine section will be magnified to the extent that the inlet moment of momentum is increased.

Corresponding vectors for the second stator section and the third turbine section are indicated also in FIGURE 4.

At the exit of the second stator section, the toroidal fluid flow is represented by the vector $F_o''$. The flow along the blade is represented by the vector $W_o''$. The vector sum is equal to $V_o''$.

The tangential component of the absolute fluid flow velocity is designated by the symbol $S_o''$.

The blade angle at the exit of the second stator section is designated by the symbol $\Gamma''$. The corresponding angle for the first stator section is $\Gamma'$.

If we assume that the blades of the third turbine section assume the dotted line position shown in FIGURE 4, the tangential component of the absolute fluid flow velocity vector can be represented as shown at $S_o$. Under stall conditions and at very low speed ratios, the vector $S_o$ is smaller than the vector $S_o''$. It follows from this, therefore, that a positive driving torque will be imparted to the third turbine section. This torque supplements the torque of the first turbine section and the combined torque of the turbine sections is distributed to the turbine shaft 128.

As the speed ratio increases, however, the flow entrance vector at the inlet of the third turbine section will shift between the two extremes represented by the letters C and D. It will be apparent, therefore, that at increased speed ratios the moment of momentum of the fluid that passes through the third turbine section will decrease. If the blade were held stationary, a negative torque would be developed by the fluid which would subtract from the net turbine torque made available to the shaft 128. To overcome this characteristic, the blades of the third turbine section are adjustable in the manner previously described. At increased speed ratios, the angularity of the blades can be shifted to the full line position shown in FIGURE 4. Under these conditions, a positive torque contribution will be provided by the third turbine section throughout an increased speed ratio range.

Provision may be made for providing an infinitely variable adjustment of the blades 58 of the third turbine section. In this way, optimum performance can be obtained throughout the entire speed ratio range and the need for making design compromises is then avoided. This infinite variation in angularity can be accomplished by providing a controlled pressure to the chamber 82 of the blade adjusting servo. This pressure can be obtained by a valve system that is sensitive to engine torque demand as well as the driven speed of the driven member.

By employing a turbine arrangement with a third turbine section situated adjacent the entrance section of the impeller, the converter stall speed will be reduced to any desired value depending upon the blade geometry that is chosen. The impeller speed will increase rapidly, however, as the speed ratio increases, and a relatively rapidly rising size factor characteristic then results.

Any torque augmentation that is obtained by the third turbine section will result, of course, in a decrease in the moment of momentum of the fluid that passes through the third turbine section. This then necessarily means that the tangential component of the absolute fluid flow velocity vector in the direction of rotation of the impeller will be decreased. It is because of this that the impeller speed will be reduced at stall. The torque contribution of the third turbine section fades, however, as speed ratio increases. The influence of the third turbine section upon the magnitude of the absolute fluid flow velocity vector at the entrance section of the first impeller section thus progressively diminishes. The size factor then will increase rapidly upon increased speed ratios and will not remain relatively uniform, as in conventional arrangements, prior to the time the coupling range is achieved. The peak engine torque then can be reached quickly during acceleration.

In FIGURE 4, U represents the rotational vector due to rotation of the third turbine section. The blade angle itself is represented by the symbol $\Gamma$ and the vector sum of the rotational vector and the flow $W_o$ along the blade is represented by the symbol $V_o$. The toroidal fluid flow, of course, is represented by the symbol $F_o$.

Referring next to FIGURE 5, I have illustrated a modified form of my invention. It is similar to the construction shown in FIGURE 3, but the angularity of the blades of the second impeller section can be changed. The components of the structure of FIGURE 5 that have counterpart elements in the construction of FIGURE 3 have been designated by similar reference characters, although primed notations have been added.

The blades 186' of the second impeller section are mounted upon individual shafts 200 which in turn are supported by the impeller shell part 22'. Carried by the shell part 22' is a servo cylinder member 202 which cooperates with the inner surface of the shell part 22' and with an annular piston 204 to define a pressure cavity 206. Piston 204 can be connected to an offset crank 208 which in turn is connected to shaft 200. A separate crank 208 can be provided for each shaft 200, and each is connected to the piston 204. This connection is schematically illustrated at 210 in FIGURE 3.

Fluid pressure can be admitted to the cavity 206 in any suitable fashion.

In FIGURE 5A I have illustrated two positions for the blades 186'. The blades may be adjusted to the dotted line position shown in FIGURE 5A under low speed ratio and start up conditions to produce a maximum starting torque. When the blades 186' are adjusted to the dotted line position shown in FIGURE 5A, the vectors will be augmented relative to the corresponding tangential fluid flow velocity vector at the entrance region of the second impeller section. This is due to an increase in the moment of momentum of the fluid that passes through it.

In order to maintain coupling efficiency and to improve efficiency during operation at the higher speed ratios, the angularity of the blades 186' should be adjusted to the full-line position shown in FIGURE 5A. This, of course, is done by varying the pressure in cavity 206.

Figure 1:
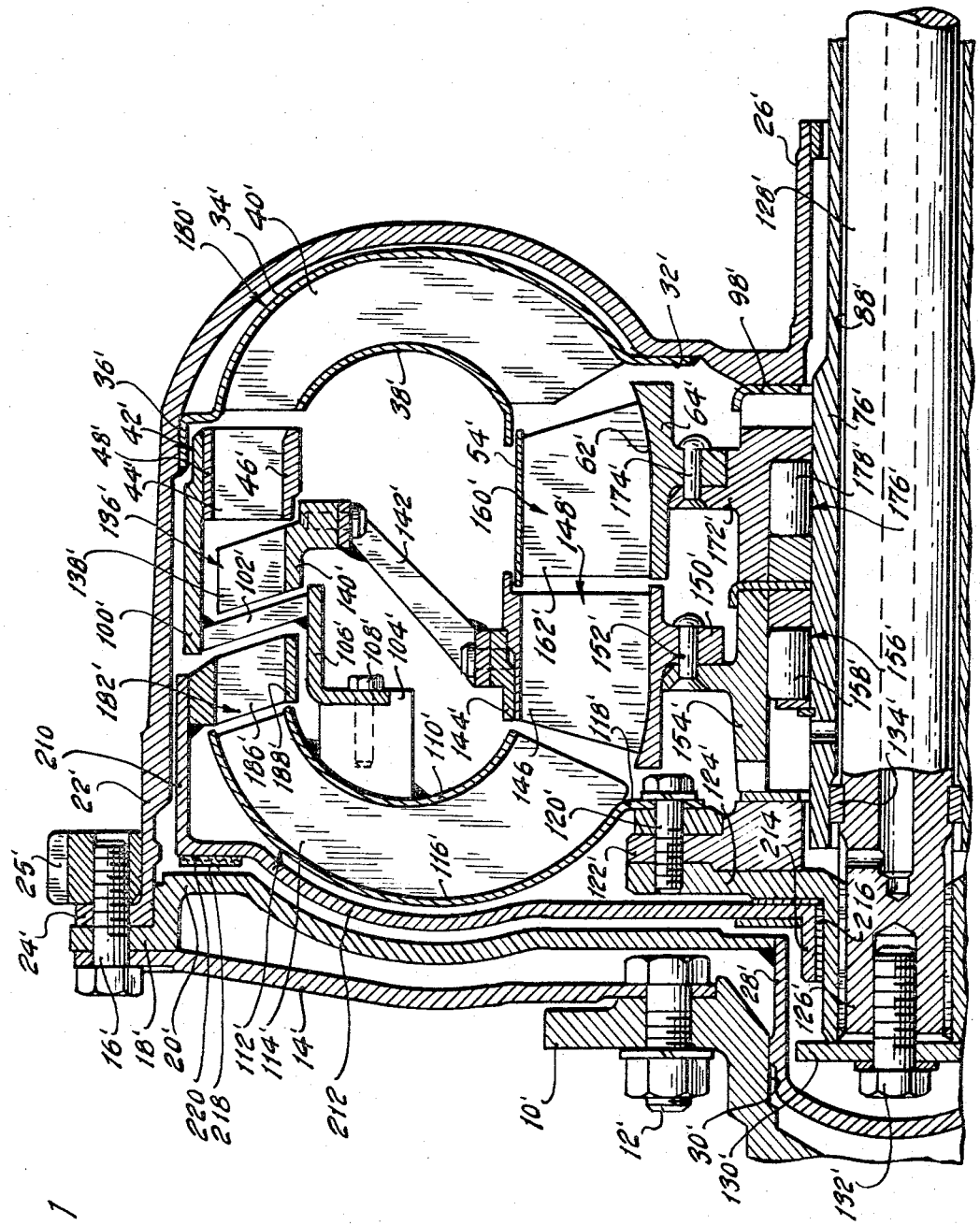
FIGURE 1 shows in cross-sectional form a compound torque converter having features of my invention.

In the embodiment shown in FIGURE 1, I have provided a hydrokinetic torque converter mechanism having features that are similar to the embodiment of FIGURE 3 although the third turbine has been deleted. The elements of the embodiment of FIGURE 1 that have counterpart elements in the embodiment of FIGURE 3 have been identified by the same reference characters as the characters used in FIGURE 3 although primed notations have been added.

In the embodiment of FIGURE 1 the second impeller 182' is connected to a clutch member 210 having a radially inwardly extending portion 212. This portion is provided with a hub sleeve 214 which is journaled by means of a bushing 216 on member 124'. This member is situated between the outer shroud 116' of the turbine 112' and the impeller shell part 20'. The impeller shell is formed with an annular clutch surface 218 which is adapted to be engaged by a clutch disc 220 carried by the outer periphery of the member 212.

The space between member 212 and the shell part 20' is in fluid communication with a passage, not shown, which in turn can be pressurized or exhausted selectively. When this passage is exhausted fluid flow tends to occur from the interior of the torus cavity in a radially inward direction across the surface 218. This creates a pressure differential which in turn tends to establish a force differential across the member 212. This causes the clutch member 220 to frictionally engage surface 218. The impellers thus rotate in unison. This locked-up condition is established during operation in the cruise range to increase cruising efficiency. It is released during operation in the low speed ratio high performance operating range.

Figure 2:
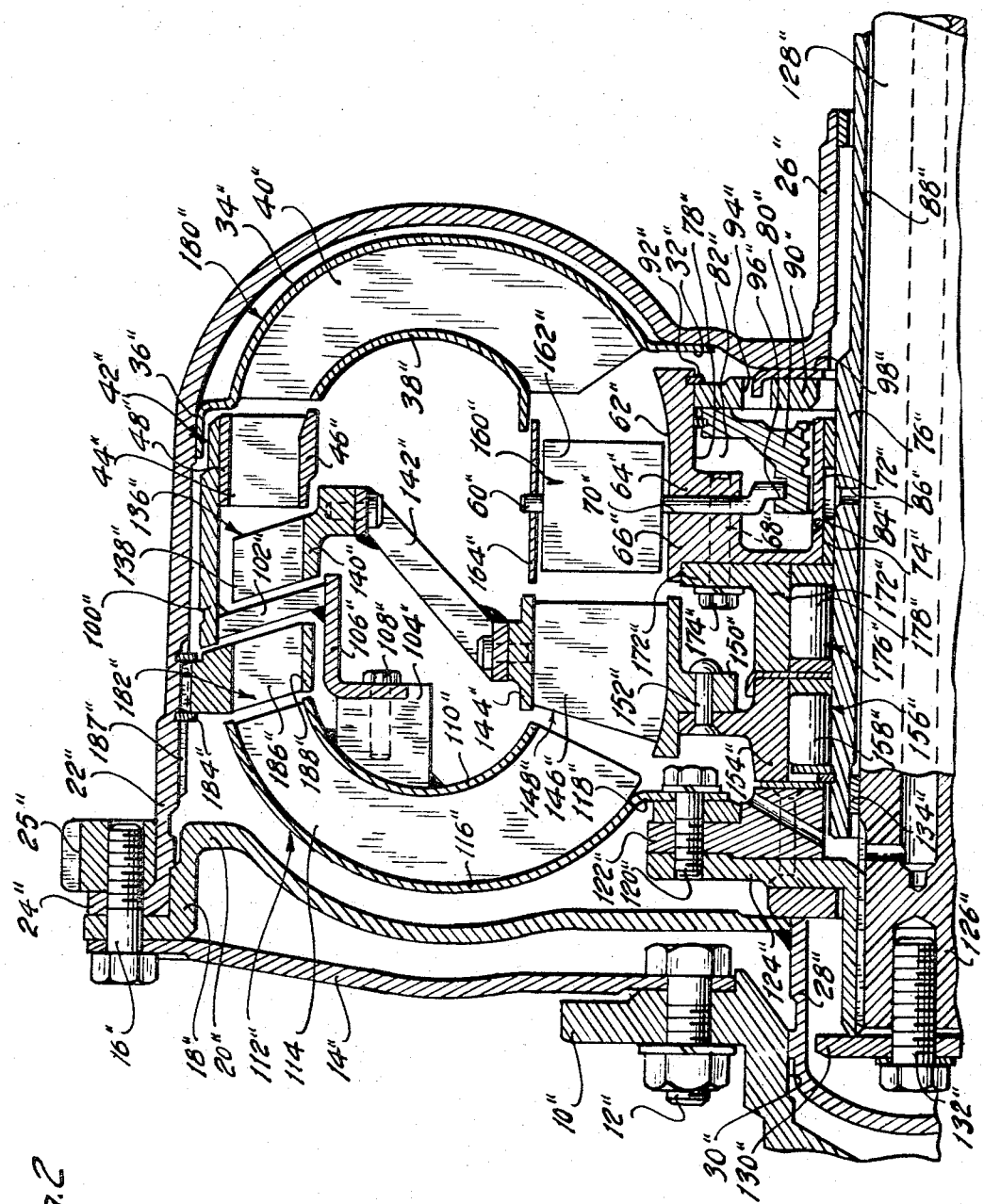
FIGURE 2 shows in cross-sectional form a second embodiment of my invention. This embodiment includes an adjustable stator.

The embodiment of FIGURE 2 is similar to the embodiment of FIGURE 3 except that the third turbine stage has been eliminated in the FIGURE 2 embodiment. The FIGURE 2 embodiment includes, however, a second stator 160" having blades 162" whose angularity can be adjusted by means of a fluid pressure operated servo that resembles the servo for the third turbine of the FIGURE 3 embodiment. For this reason identical reference characters are used although double primed notations have been added to the servo of FIGURE 2 as well as to the other elements of the FIGURE 2 construction that have a counterpart in the FIGURE 3 construction. The offset shafts 60" are connected to the stator blades 162" and rotate them to either a high performance position or a cruising position.

Having thus described preferred embodiments of my invention, what I claim and desire to secure by United States Letters Patent is:

1. A hydrokinetic torque converter mechanism comprising a compound impeller, a compound turbine and a compound stator situated in toroidal fluid flow relationship with a common torus circuit, said turbine comprising at least two bladed sections, said impeller comprising two bladed sections and said stator comprising two bladed sections, a first turbine section being located at the flow exit region of a first impeller section, a first stator section being located between said first turbine section and the second impeller section, the entrance region of the second turbine section being located adjacent the flow exit region of said second impeller section, the second stator section being located between the flow exit region of said second turbine section and the flow entrance region of said first impeller section.

2. A hydrokinetic torque converter mechanism comprising a compound impeller, a compound turbine and a compound stator situated in toroidal fluid flow relationship within a common torus circuit, said turbine comprising at least two bladed sections, said impeller comprising two bladed sections and said stator comprising two bladed sections, the first turbine section being located at the flow exit region of the first impeller section, the first stator section being located between the first turbine section and the second impeller section, the entrance region of the second turbine section being located adjacent the flow exit region of the second impeller section, the second stator section being located between the flow exit region of the second turbine section and the flow entrance region of said first impeller section, the first impeller section being located at a radial outflow region of said circuit, the second turbine section being located at a radial inflow region of said circuit, the first turbine section, the first stator section and the second impeller section being located at a radially outward region of said circuit.

3. A hydrokinetic torque converter mechanism comprising a compound impeller, a compound turbine and a compound stator situated in toroidal fluid flow relationship within a common torus circuit, said turbine comprising at least two bladed sections, said impeller comprising two bladed sections and said stator comprising two bladed sections, the first turbine section being located at the flow exit region of the first impeller section, the first stator section being located between the first turbine section and the second impeller section, the entrance region of the second turbine section being located adjacent the flow exit region of the second impeller section, the second stator section being located at the flow exit region of the second turbine section, the first impeller section being located at a radial outflow region of said circuit, the second turbine section being located at a radial inflow region of said circuit, the first turbine section, the first stator section and the second impeller section being located at a radially outward region of said circuit, each impeller section being connected together for rotation in unison.

4. A hydrokinetic torque converter mechanism comprising a compound impeller, a compound turbine and a compound stator situated in toroidal fluid flow relationship within a common torus circuit, said turbine comprising at least two bladed sections, said impeller comprising two bladed sections and said stator comprising two bladed sections, the first turbine section being located at the flow exit region of the first impeller section, the first stator section being located between the first turbine section and the second impeller section, the entrance region of the second turbine section being located adjacent the flow exit region of the second impeller section, the second stator section being located at the flow exit region of the second turbine section, the first impeller section being located at a radial outflow region of said circuit, the second turbine section being located at a radial inflow region of said circuit, the first turbine section, the first stator section and the second impeller section being located at a radially outward region of said circuit, each impeller section being connected together for rotation in unison, first overrunning brake means for inhibiting rotation of said first stator section against rotation in one direction and for permitting free-running motion in the opposite direction, and a second overrunning brake means for separately inhibiting rotation of the second stator section against rotation in said one direction while accommodating free-running motion thereof in said opposite direction.

5. A hydrokinetic torque converter mechanism comprising a compound impeller, a compound turbine and a compound stator situated in toroidal fluid flow relationship within a common torus circuit, said turbine comprising at least two bladed sections, said impeller comprising two bladed sections and said stator comprising two bladed sections, the first turbine section being located at the flow exit region of the first impeller section, the first stator section being located between the first turbine section and the second impeller section, the entrance region of the second turbine section being located adjacent the flow exit region of the second impeller section, the second stator section being located at the flow exit region of the second turbine section, the first impeller section being located at a radial outflow region of said circuit, the second turbine section being located at a radial inflow region of said circuit, the first turbine section, the first stator section and the second impeller section being located at a radially outward region of said circuit, each impeller section being connected together for rotation in unison, first overrunning brake means for inhibiting rotation of the first stator section against rotation in one direction and for permitting free-running motion in the opposite direction, second overrunning brake means for inhibiting rotation of the second stator section against rotation in said one direction while accommodating free-running motion thereof in said opposite direction, and a third turbine section mechanically connected to said first and second turbine sections, said third turbine section being located at a radially inward region of said circuit adjacent the flow entrance region of the first impeller section.

6. A hydrokinetic torque converter mechanism comprising a compound impeller, a compound turbine and a compound stator situated in toroidal fluid flow relationship within a common torus circuit, said turbine comprising at least two bladed sections, said impeller comprising two bladed sections and said stator comprising two bladed sections, the first turbine section being located at the flow exit region of said first impeller section, the first stator section being located between the first turbine section and the second impeller section, the entrance region of the second turbine section being located adjacent the flow exit region of the second impeller section, the second stator section being located at the flow exit region of the second turbine section, and means for adjustably positioning the angularity of the blades of the second impeller section relative to the angularity of the blades of the other sections.

7. A hydrokinetic torque converter mechanism comprising a compound impeller, a compound turbine and a compound stator situated in toroidal fluid flow relationship within a common torus circuit, said turbine comprising at least two bladed sections, said impeller comprising two bladed sections and said stator comprising two bladed sections, the first turbine section being located at the flow exit region of said first impeller section, the first stator section being located between the first turbine section and the second impeller section, the entrance region of the second turbine section being located adjacent the flow exit region of the second impeller section, the second stator section being located at the flow exit region of the second turbine section, the first impeller section being located at a radial outflow region of said circuit, the second turbine section being located at a radial inflow region of said circuit, the first turbine section, the first stator section and the second impeller section being located at a radially outward region of said circuit, and means for adjustably positioning the angularity of the blades of the second impeller section relative to the angularity of the blades of the other sections.

8. A hydrokinetic torque converter mechanism comprising a compound impeller, a compound turbine and a compound stator situated in toroidal fluid flow relationship within a common torus circuit, said turbine comprising at least two bladed sections, said impeller comprising two bladed sections and said stator comprising two bladed sections, the first turbine section being located at the flow exit region of the first impeller section, the first stator section being located between the first turbine section and the second impeller section, the entrance region of said second turbine section being located adjacent the flow exit region of the second impeller section, the second stator section being located at the flow exit region of the second turbine section, the first impeller section being located at a radial outflow region of said circuit, the second turbine section being located at a radial inflow region of said circuit, the first turbine section, the first stator section and the second impeller section being located at a radially outward region of said circuit, each impeller section being connected together for rotation in unison, and means for adjustably positioning the angularity of the blades of the second impeller section relative to the angularity of the blades of the other sections.

References Cited by the Examiner

UNITED STATES PATENTS

| | | | |
|---|---|---|---|
| 2,339,483 | 1/44 | Jandasek | 60—54 |
| 2,339,484 | 1/44 | Jandasek | 60—54 |
| 2,762,196 | 9/56 | Ullery | 60—54 |
| 2,762,199 | 9/56 | Ullery | 60—54 |
| 2,893,266 | 7/59 | Kelley | 60—54 X |
| 2,929,267 | 3/60 | Wilson | 60—54 X |
| 3,079,756 | 3/63 | Farrell | 60—54 |
| 3,083,589 | 4/63 | Knowles et al. | 60—54 X |

FOREIGN PATENTS 738,699   10/55   Great Britain.

JULIUS E. WEST, *Primary Examiner.*